Figure 3:
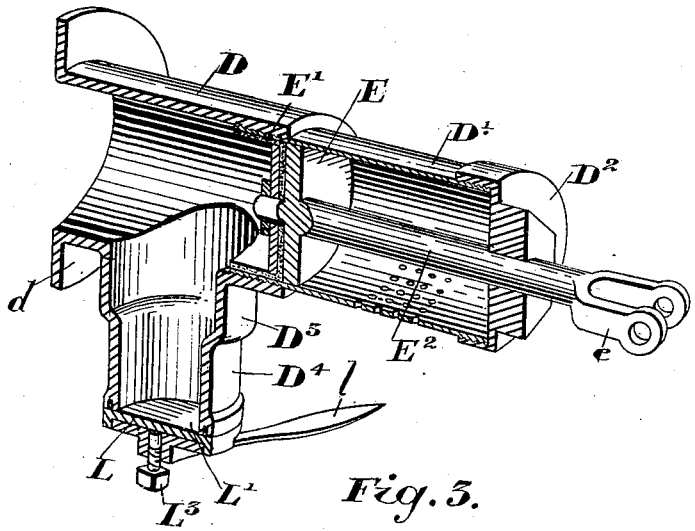

(No Model.)
J. JONES & A. GILLIES.
STREET SPRINKLER.
No. 599,938.
2 Sheets—Sheet 1.
Patented Mar. 1, 1898.
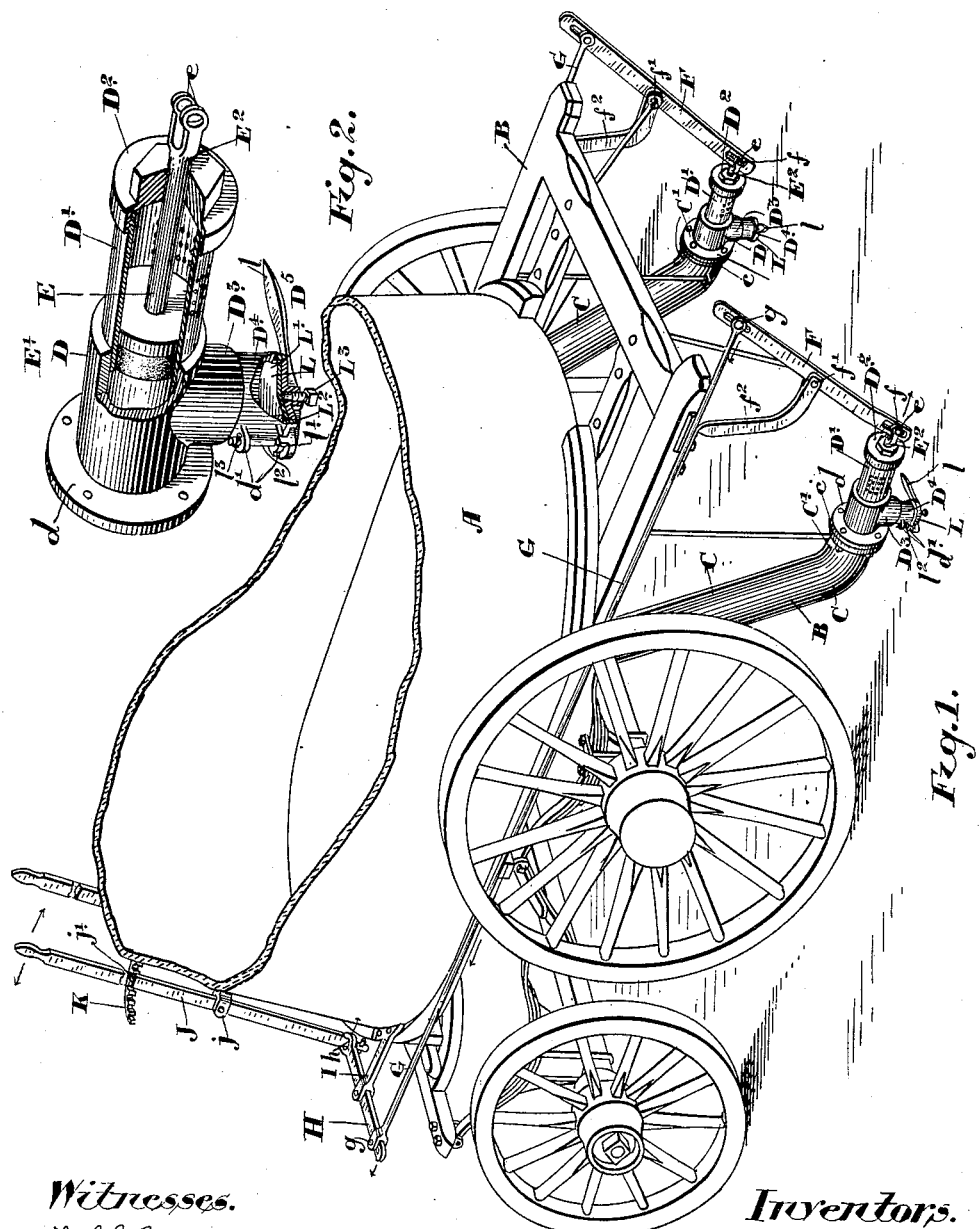
Witnesses.
H. J. S. Young.
H. Dunnison.
Inventors.
John Jones.
Alex. Gillies.
by Fetherstonhaugh & Co.
Attys (No Model.)

J. JONES & A. GILLIES.
STREET SPRINKLER.

No. 599,938.

2 Sheets—Sheet 2.

Patented Mar. 1, 1898.

Witnesses

Inventors.

UNITED STATES PATENT OFFICE.

JOHN JONES AND ALEXANDER GILLIES, OF TORONTO, CANADA, ASSIGNORS TO JAMES EDWARD KNOX, OF SAME PLACE.

STREET-SPRINKLER.

SPECIFICATION forming part of Letters Patent No. 599,938, dated March 1, 1898.

Application filed July 26, 1897. Serial No. 645,990. (No model.)

*To all whom it may concern:*

Be it known that we, JOHN JONES and ALEXANDER GILLIES, of the city of Toronto, in the county of York, in the Province of Ontario, Canada, have invented certain new and useful Improvements in Street-Sprinklers, of which the following is a specification.

Our invention relates to improvements in street-sprinklers; and the object of the invention is to devise a form of sprinkler which may be readily manipulated to throw a laterally-extending spray of any desired volume either to one or both sides of the road, as required, and which may be turned off momentarily in passing a crossing, so as to leave it perfectly dry and yet not leave any portion of the length of the roadway unsprinkled; and it consists, essentially, of two independent downwardly and rearwardly extending pipes leading from the tank of a watering-cart, one at each side, and having spraying-nozzles located at the rear end, peculiarly formed and arranged to throw the spray laterally, the nozzles being provided with a valve plug or piston manipulated by a system of levers controlling the volume of sprays and the shutting of them off, as hereinafter more particularly explained.

Figure 1 is a perspective view of watering-cart provided with our improved form of sprinkler. Fig. 2 is an enlarged detail of the nozzle. Fig. 3 is an enlarged sectional detail of the nozzle.

In the drawings like letters of reference indicate corresponding parts in each figure.

A is the tank of the watering-cart, and B is the frame on which it is supported.

C C are two pipes leading obliquely rearwardly from the bottom of the tank with which they communicate. The pipes C C have bent ends C' C', provided with flanges c c, to which are connected the spraying-nozzles D D by bolts passing through the flanges c and d of the spraying-nozzle. The spraying-nozzles D D are cylindrical in form and provided with reduced cylindrical rear ends D', which fit within the front portion of the nozzle. Each portion D' is provided with semi-annular rows of perforations located, preferably, around the bottom of the cylindrical portion D'.

$D^2$ is a cap screwed onto the outer end of the cylindrical portion D', and E is a piston provided with suitable packing-ring E'.

$E^2$ is the piston-rod, which is provided with the forked end e, into which extends the lower end of the lever F, which is slotted and held therein by a pin f. The lever F is pivoted on pins f' in the forked end of the bracket $f^2$, secured in the bottom of the frame B.

G is a rod connected by the pin g to the slotted upper end of the lever F and extending forwardly to the outer end of the lever H. The rod G is forked at both ends and pivotally connected at the front to the lever H. The lever H is pivoted on the end of a bracket I and has a hole h made in its inner end through which extends the lower reduced end of the manipulating-lever J, which is pivoted on another bracket j, secured in front of the tank. The upper end of the lever J is provided with an inwardly laterally extending pin j', which is designed to be engaged with the teeth of the quadrant K by springing the lever laterally at the upper end.

$D^3$ is a downwardly-extending branch of the cylinder D, which is provided with a reduced end $D^4$, having lugs d'.

L is a closing-cap provided with a handle l and a lateral lug l', from which projects upwardly the pin $l^2$. The pin $l^2$ extends through the lugs d', in which it is held by a cross-pin $l^3$.

L' is a plate having an annular flange $L^2$, within which the cap L fits.

$L^3$ is a set-screw extending through a boss in the center of the cap L and designed to adjust the plate L', so as to take up the wear and prevent any leakage from the branch $D^3$.

The object of the branch $D^3$ and the cap L is to provide for the removal of sediment should any accumulate in the forward end of the nozzle.

It will now be seen that by pushing either of the levers forward, as indicated by arrow, the lever H, rod G, and lever F will be thrown in the direction indicated by arrow and thereby throw the piston E rearwardly, thus allowing the water in the tank to pass down through the pipe C and outwardly through the semi-annular rows of perforations. If the piston does not uncover all the perforations, of course the strength or volume of the stream will be reduced and this may be of course regulated to a nicety.

On account of the peculiar arrangement of the perforations it will be understood that the water will be thrown laterally in alinement.

To close the perforations in either nozzle, the lever must be thrown in the reverse direction to that indicated by arrow into position shown in Fig. 2, when the water will be immediately cut off.

As there is a pipe or nozzle located on each side of the cart to the rear and as they are independent of each other and operated by independent mechanism it will be readily seen that one side of the street alone may be watered, or both, as desired.

On account of the peculiar formation of the nozzle and the arrangement of the perforations in the same the sprays or streams of water will be thrown laterally in alinement or directly crosswise of the street as the cart moves along it. Consequently the driver of the cart may at any time in passing a crossing shut off the water and leave the crossing perfectly dry and then throw the nozzles open, whereupon the water will be sprinkled directly across when the crossing is passed. This obviates leaving a great portion of the street unwatered, as is so commonly the case at present when the ordinary watering-cart is used.

Another advantage which we derive from the independent action of the sprinkling-nozzles is that, if desired, the perforations of one nozzle may be opened sufficiently far so as to water that side of the roadway lightly, while the other may be thrown open still farther and water the remaining portion with a heavier stream. This is very advantageous in watering different classes of pavement on the same street, as where the track portion would be made of asphalt and the side portions of any other material. In passing vehicles on the street also one side can be shut off completely and thus the annoyance to the occupants of such vehicle completely obviated.

It will also be noted on reference to the drawings that we extend the perforations on the outside of the spraying-nozzle higher up than the inside, and for this reason the distance between the nozzles requires only a short spray of water to completely cover the road at that portion, while the outer sides of the nozzles require to throw the spray a much greater distance toward the curb.

What we claim as our invention is—

1. In a device of the class described, in combination the cylindrical spraying-nozzle, the downwardly-extending branch thereof and the closing-cap for such branch as and for the purpose specified.

2. In a device of the class described, in combination the cylindrical spraying-nozzle, the downwardly-extending branch thereof, the closing-cap L provided with a handle $l$ and lug $l'$ having upwardly-extending pin $l^2$ pivoted in lugs $d'$ of the downwardly-extending branch, and the plate L' having the adjusting-screw $L^2$ arranged as and for the purpose specified.

JOHN JONES.
ALEXANDER GILLIES.

Witnesses:
B. BOYD,
H. DENNISON.